United States Patent [19]

Gulati et al.

[11] 4,358,181

[45] Nov. 9, 1982

[54] GRADIENT INDEX OPTICAL WAVEGUIDE AND METHOD OF MAKING

[75] Inventors: Suresh T. Gulati, Elmira; George W. Scherer, Painted Post, both of N.Y.

[73] Assignee: Corning Glass Works, Corning, N.Y.

[21] Appl. No.: 171,958

[22] Filed: Jul. 24, 1980

Related U.S. Application Data

[63] Continuation of Ser. No. 837,927, Sep. 29, 1977, abandoned.

[51] Int. Cl.³ .................... C03B 37/07; C03B 37/075
[52] U.S. Cl. ................... 350/96.31; 65/3.11; 65/3.12; 350/96.34; 427/163
[58] Field of Search ............ 65/3.11, 3.12, 3.2, 65/18.2; 427/163, 167; 350/96.31, 96.34

[56] References Cited

U.S. PATENT DOCUMENTS

| | | | |
|---|---|---|---|
| 3,778,132 | 12/1973 | Pinnow et al. | 65/3.12 X |
| 3,823,995 | 7/1974 | Carpenter | 65/3.12 X |
| 3,826,560 | 7/1974 | Schultz | 65/3.12 X |
| 3,957,474 | 5/1976 | Kobayashi et al. | 65/3.12 |
| 3,982,916 | 9/1976 | Miller | 65/3.12 |
| 4,017,288 | 4/1977 | French et al. | 65/3.12 X |
| 4,025,156 | 5/1977 | Gloge et al. | 350/96.34 X |
| 4,042,404 | 8/1977 | Schultz | 65/3.12 X |
| 4,062,665 | 12/1977 | Izawa | 65/3.12 |
| 4,148,621 | 4/1979 | Gliemeroth | 65/3.12 |
| 4,161,505 | 7/1979 | Shiraishi et al. | 65/3.12 X |
| 4,181,403 | 1/1980 | Macedo et al. | 65/3.11 X |
| 4,194,807 | 3/1980 | Gliemeroth | 350/96.31 |
| 4,243,298 | 1/1981 | Kao et al. | 65/3.12 X |

OTHER PUBLICATIONS

Rigterink, "Material Systems ... of Glass Fiber Optical Waveguides", Ceramic Bulletin, vol. 55, No. 9, (1976), pp. 775–780.

O'Connor et al., "Preparation . . . of High Silica, Graded Index Optical Fibers", Ceramic Bulletin, vol. 55, No. 5, (1976), pp. 513–519.

Primary Examiner—Richard V. Fisher
Attorney, Agent, or Firm—Walter S. Zebrowski

[57] ABSTRACT

In the method of making a preform for a high numerical aperture gradient index optical waveguide, the concentration of two dopant constituents is changed during fabrication. Concentration of the first dopant, $GeO_2$, is changed radially as the preform is built up in order to produce the desired radial refractive index gradient. The concentration of the second dopant, $B_2O_3$, is changed radially to compensate for the radial change in thermal expansion coefficient caused by the varying $GeO_2$ concentration. $B_2O_3$ is added to the cladding layer to make the thermal expansion coefficient of the cladding equal to or greater than the composite thermal expansion coefficient of the core. The magnitude of residual tension at the inner surface caused by thermal expansion gradients is reduced and premature cracking of the preform is eliminated.

9 Claims, 5 Drawing Figures

GRADIENT INDEX OPTICAL WAVEGUIDE AND METHOD OF MAKING

This is a continuation of application Ser. No. 837,927, filed Sept. 29, 1977, now abandoned.

BACKGROUND OF THE INVENTION

This invention relates to optical waveguides and more particularly to a method of making a high numerical aperture gradient index waveguide.

Waveguides used in optical communication systems are herein referred to as "optical waveguides," and are normally constructed from a transparent dielectric material, such as glass or plastic.

Gradient index optical waveguides have a radially varying composition and consequently a radially varying refractive index. These waveguides focus light propagated axially along them. This focusing effect is described as a high numerical aperture. U.S. Pat. No. 3,823,995, Carpenter and U.S. Pat. No. 3,826,560, Schultz, describe techniques for making gradient index optical waveguides.

The aforementioned Schultz patent describes a flame hydrolysis technique for making a glass preform wherein the concentration of a dopant added to a glass forming silicon compound is changed as the preform is built-up radially. Changing concentration of the dopant changes the refractive index in the desired manner.

Optical waveguides having high numerical aperture values (approximately 0.20 or more) have a sharp radial composition gradient which causes stress in the waveguide. These stresses arise from the variation in the thermal expansion coefficient introduced by the radial variation in composition. Also, in outside vapor phase oxidation processes, such as that described in the aforementioned Schultz patent, removal of the starting member from the preform results in a small hole at the center. Residual tension in the waveguide has its highest value at the surface of this hole. All of these stresses cause fracture and failure when the preform is sintered into an optical waveguide preform and cooled. It is desirable to reduce these stresses.

SUMMARY OF THE INVENTION

In accordance with this invention, stress is considerably reduced in a gradient index optical waveguide by radially controlling the concentration of the composition forming the waveguide.

In carrying out the invention, the concentration of one or more dopants is changed radially as the preform is built-up to produce a radially varying index of refraction and the concentration of another dopant, $B_2O_3$, is changed radially to compensate for the radial change in thermal expansion coefficient caused by the change in concentration of the first constituent.

Further in accordance with the invention, a constituent having substantially no effect on the index of refraction is added to the cladding glass of an optical waveguide to increase the thermal expansion coefficient of the cladding so that it is pproximately equal to the composite thermal expansion coefficient of the core of the waveguide.

It is an object of the present invention to minimize the residual tension at the inner surface of an optical waveguide preform.

It is another object of the present invention to control the composition of an optical waveguide so that the inner part of the waveguide preform is placed under compression when it cools.

DESCRIPTION OF THE PREFERRED EMBODIMENT

Figure 1:
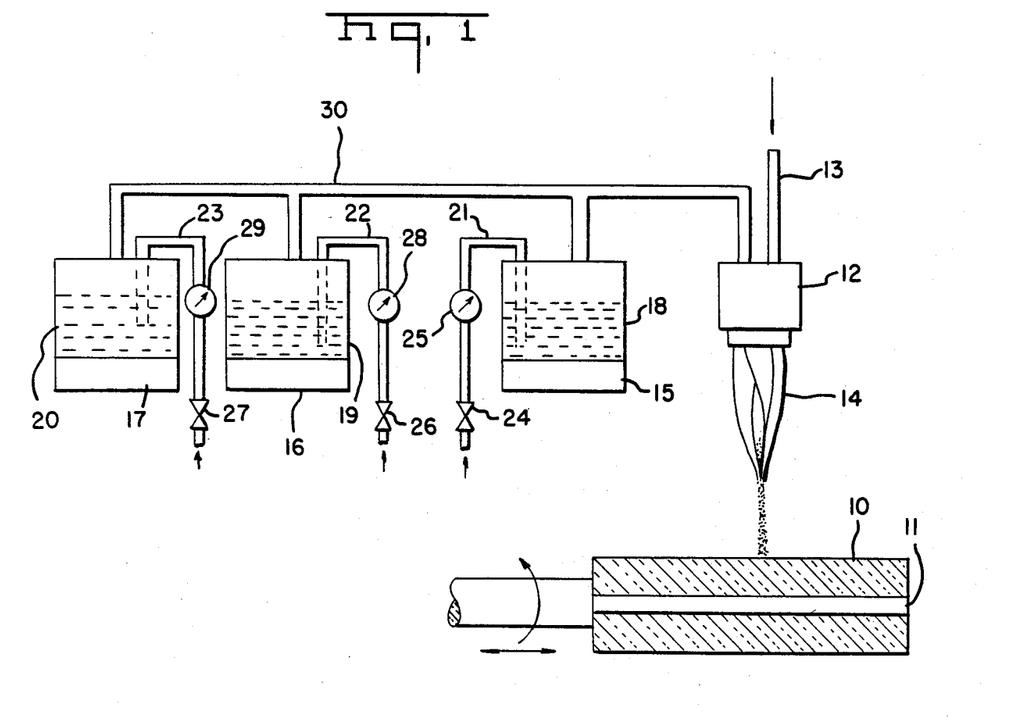
FIG. 1 depicts the process of making an optical waveguide preform in accordance with this invention.

Referring to FIG. 1, a layer 10 of glass is applied to a substantially cylindrical glass starting member or bait rod 11 by means of outside vapor phase oxidation burner 12. Fuel gas and oxygen or air are supplied to burner 12 from a source not shown by a suitable means such as pipe 13. This mixture is burned to produce flame 14 which is emitted from the burner.

Containers 15, 16 and 17 hold quantities of liquid constituents 18, 19 and 20 respectively which will ultimately form layer 10. A suitable gaseous medium, such as oxygen or the like, is supplied to the containers are bubbled through the liquids by means of tubes 21, 22 and 23. The gaseous medium or carrier gas is supplied from a suitable source, not shown, in predetermined quantities and at predetermined pressures. The flow of carrier gas which is bubbled through liquid constituent 18 in container 15 is regulated by valve 24, the flow rate of this carrier gas being indicated by gauge 25. Similarly, the flows of carrier gas bubbled through liquid constituents 19 and 20 in containers 16 and 17 are regulated by valves 26 and 27 with the flow rates of these gases being indicated by gauges 28 and 29.

The liquid constituents in the containers are maintained at the desired temperatures by heaters. As the carrier gas is bubbled through the heated liquid constituents, vapors of this liquid become entrained in the carrier gas and are exhausted by means of tube or pipe 30. The carrier gas vapor mixture is fed to outside vapor phase oxidation burner 12 and is injected into flame 14 wherein the gas vapor mixture is oxidized to form a glass soot. The soot leaves flame 14 in a stream which is directed toward starting member 11. Starting member 11 is both rotated and translated as indicated by the arrows adjacent the supporting end of the starting member so that a uniform deposition of soot is applied to the starting member.

Of course, it will be understood that a plurality of burners, in a row or radially displaced, can be provided adjacent the starting member so that a longitudinally uniform soot layer can be produced without the need for translating the starting member. In such an embodiment, starting member 11 would only have to be rotated.

Containers 15–17 contain a glass forming compound and at least two dopants. As an example, container 15 contains $SiCl_4$, container 16 contains $GeCl_4$ and container 17 contains $BCl_3$. The valves 24 and 26 are controlled in the manner described, for example, in the aforementioned Schultz patent to produce a preform which has a parabolic gradient index of refraction. Simultaneously, valve 27 is controlled to introduce a varying concentration of the second dopant into the flame hydrolysis stream. In the example under consideration, the concentration of GeO₂, controlled by valve 26, is decreased as the layer 10 builds up radially. This has the effect of producing a parabolically decreasing radial index of refraction in the layer 10. Simultaneously, the concentration of B₂O₃, controlled by valve 27, is increased. B₂O₃ has substantially no effect on the index of refraction. (Actually B₂O₃ lowers the index of refraction very slightly with increasing concentration). B₂O₃ has the effect of increasing the theraml expansion coefficient with increasing concentration. Therefore, by changing the concentration of B₂O₃ radially, compensation can be made for the radial change in thermal expansion coefficient which would otherwise be caused by the decrease in concentration of the GeO₂. By adjusting the germanium and boric oxide dopant variations in the preform, the residual tension at the inner surface can be minimized.

The foregoing process is commonly referred to as outside vapor phase oxidation (OVPO). After the gradient index preform is laid down, a cladding layer is applied to the preform. Application of the cladding layer is also commonly carried out by OVPO or flame oxidation as depicted in FIG. 1. In order to further reduce residual tension in the preform or eliminate it altogether, the concentrations of the constituents forming the cladding composition are adjusted. The amount of boric oxide added to the cladding layer is controlled by valve 27 so that the thermal expansion coefficient of the cladding is slightly higher than the composite expansion coefficient of the gradient core at the set point. In this manner, residual stresses in the core due to a higher expansion cladding become compressive and nullify any tension at the inner surface which was previously present due to parabolic expansion variation of the core. The cladding itself would then experience a slight tension but since the surface quality of cladding is superior, it can withstand a slight tension without causing failure of the preform. Furthermore, the value of this tension in the cladding can be kept at a safe level by adjusting the boric oxide content.

The manner in which the concentrations of the constituents are changed to eliminate stress will be apparent from the following analysis and examples.

The thermal-elastic properties of the gradient core are related to the composition profile in the following manner:

$$\alpha_s = a_0 + a_1 X + a_2 Y + a_3 XY + a_4 X^2 + a_5 Y^2 \quad (1)$$

$$T_s = T_0 + T_1 X + T_2 Y + T_3 XY + T_4 X^2 + T_5 Y^2 \quad (2)$$

$$E = E_0 + E_1 X + E_2 Y + E_3 XY + E_4 X^2 + E_5 Y^2 \quad (3)$$

In the above equations $\alpha_s$ is the expansion coefficient at the setting temperature, $T_s$ is the setting temperature, E is the elastic modulus at room temperature and X and Y are weight percents of two different oxides which vary parabolically with the radial position:

$$X = X_o + X_1 \left( \frac{r^2 - a^2}{d^2 - a^2} \right) \quad (4)$$

$$Y = Y_o + Y_1 \left( \frac{r^2 - a^2}{d^2 - a^2} \right) \quad (5)$$

and in which a is the radius of the hole in the preform and d is the outer radius of the gradient core.

Substitutions of eqns. (4) and (5) in eqns. (1) through (3) along with the neglect of mixed and second order terms results in the parabolic variation of thermal expansion coefficient, setting temperature and elastic modulus with the radial coordinate r:

$$\alpha_s(r) = \alpha_i - (\alpha_i - \alpha_o)\left( \frac{r^2 - a^2}{d^2 - a^2} \right) \quad (6)$$

$$T_s(r) = T_i - (T_i - T_o)\left( \frac{r^2 - a^2}{d^2 - a^2} \right) \quad (7)$$

$$E(r) = E_i - (E_i - E_o)\left( \frac{r^2 - a^2}{d^2 - a^2} \right). \quad (8)$$

In these equations, the subscripts i and o denote the property value at r=a and r=d respectively.

For the purposes of analysis of residual stress, it is convenient to integrate equations (6) through (8) over the gradient core to obtain an average value of the property. Proceeding in this manner and denoting the average property value with a bar, we obtain the following remarkably simple expressions:

$$\bar{\alpha}_s = \tfrac{1}{2}(\alpha_i + \alpha_o) \quad (9)$$

$$\bar{T}_s = \tfrac{1}{2}(T_i + T_o) \quad (10)$$

$$\bar{E} = \tfrac{1}{2}(E_i + E_o). \quad (11)$$

Treating the gradient core as a hollow circular cylinder with an average setting temperature of $\bar{T}_s$ and an average elastic modulus and Poisson's ratio of $\bar{E}$ and $v$, the residual stresses in the circumferential and axial directions, which are the largest stresses, upon cooling from the setting temperature to room temperature are given by:

$$\sigma_\theta(r) = \frac{\bar{E}(T_R - \bar{T}_S)}{(1-v)r^2}\left[ \left( \frac{r^2 + a^2}{d^2 - a^2} \right) \int_a^d \alpha_S r\, dr + \int_a^r \alpha_S r\, dr - \alpha_S r^2 \right] \quad (12)$$

$$\sigma_z(r) = \frac{\bar{E}(T_R - \bar{T}_S)}{(1-v)}\left[ \frac{2}{(d^2 - a^2)} \int_a^d \alpha_S r\, dr - \alpha_S \right] \quad (13)$$

where $T_R$ denotes room temperature. The foregoing is explained in more detail in Timoshenko, S. P.; "Theory of Elasticity," Second Ed.; Mcgraw Hill, New York (1951).

Substitution of equations (6) into equations (12) and (13), followed by integration, results in the desired expressions for residual stresses due to parabolic variation of the thermal expansion coefficient in the gradient core:

$$\sigma_\theta(r) = \frac{\overline{E}(\alpha_i - \alpha_o)(\overline{T}_S - T_R)}{(1-\nu)(d^2 - a^2)} \left[ \frac{(r^2 + a^2)(r^2 + d^2)}{4r^2} - r^2 \right] \quad (14)$$

$$\sigma_z(r) = \frac{\overline{E}(\alpha_i - \alpha_o)(\overline{T}_S - T_R)}{(1-\nu)(d^2 - a^2)} \left[ \left( \frac{d^2 + a^2}{2} \right) - r^2 \right]. \quad (15)$$

It is interesting to note that $$\sigma_\theta(a) = \sigma_z(a) = \frac{\overline{E}(\alpha_i - \alpha_o)(\overline{T}_S - T_R)}{2(1-\nu)} \quad (16)$$

$$\sigma_\theta(d) = \sigma_z(d) = - \frac{\overline{E}(\alpha_i - \alpha_o)(\overline{T}_S - T_R)}{2(1-\nu)}; \quad (17)$$

i.e., the circumferential and axial stresses are equal both at the surface of the hole and at the outer surface of the gradient core. This is a direct consequence of the parabolic variation of the expansion coefficient. Also observe that equations (16) and (17) give the maximum values of tensile and compressive stresses respectively in the gradient core.

The stress analysis of the gradient index core surrounded by a cladding of constant composition is obtained by linear superposition of the foregoing solution and the additional stresses caused by cladding glass of constant composition. Denote the cladding properties by $\alpha_c$, $T_c$ and $E_c$ and its outer radius by $e$. We treat the preform (without the cladding) as a core whose average properties are $\overline{\alpha}_s$, $\overline{T}_s$ and $\overline{E}$ and are given by equations (9) through (11). Also assume that the Poisson's ratios of core and cladding glasses are equal and are denoted by $\nu$. Then the circumferential and axial stresses, which are the largest stresses, introduced upon cooling of the preform to room temperature are given by:

$$\sigma_\theta(r) = \frac{\beta E_c (T_C - T_R)(\overline{\alpha}_s - \alpha_c)\left(1 + \frac{a^2}{r^2}\right)}{\left[1 - 2\nu + \frac{e^2}{d^2} + m\beta\left(1 - 2\nu + \frac{a^2}{d^2}\right)\right]} \quad (18)$$

$$\sigma_z = \frac{\beta E_c (T_C - T_R)(\overline{\alpha}_s - \alpha_c)\left(1 + \frac{e^2}{d^2} + m\beta\frac{a^2}{d^2}\right)}{(1 + \beta m)\left(1 - 2\nu + \frac{e^2}{d^2} + m\beta\left(1 - 2\nu + \frac{a^2}{d^2}\right)\right)} \quad \Biggr\} \text{core} \quad (19)$$

and $$\sigma_\theta(r) = - \frac{E_c(T_C - T_R)(\overline{\alpha}_s - \alpha_c)\left(1 + \frac{e^2}{r^2}\right)}{\left[1 - 2\nu + \frac{e^2}{d^2} + m\beta\left(1 - 2\nu + \frac{a^2}{d^2}\right)\right]} \quad (20)$$

$$\sigma_z = - \frac{E_c(T_C - T_R)(\overline{\alpha}_s - \alpha_c)\left(1 + \frac{e^2}{d^2} + m\beta\frac{a^2}{d^2}\right)}{(+ \beta m)\left[1 - 2\nu + \frac{e^2}{d^2} + m\beta\left(1 - 2\nu + \frac{a^2}{d^2}\right)\right]} \quad \Biggr\} \text{cladding} \quad (21)$$

where $$m = E_c \sqrt{E}$$

and $$\beta = \frac{e^2 - d^2}{d^2 - a^2}.$$

The foregoing is explained in more detail in Rawson, H.; "The Theory of Stresses in Two-Component Glass-to-Metal Tube Seals," J. Sci. Instr., Vol. 26 (1949). It should be noted that the axial stress is independent of radial coordinate $r$ whereas the circumferential stress is not. The radical stress in the core is tensile and its magnitude is of the order of circumferential stress; the axial stress is the largest stress. Thus the core is in the state of triaxial tension except at the inner surface of the hole where the radial stress vanishes.

The net stresses in the core are given by the sum of equations (14) and (18) and equations (15) and (19). Similarly the net stresses in the cladding are given by the sum of equations (14) and (20) and equations (15) and (21). It follows immediately from equations (18) through (21) that by adjusting the composition of the cladding glass, its expansion coefficient $\alpha_c$ can be made either larger or smaller than $\overline{\alpha}_s$ so that the additional stresses given by equations (18) and (19) can offset those given by equations (14) and (15). The net result, of course, would be a low-stress preform with little or no danger of spontaneous failure.

The above is illustrated by two examples. First, consider a gradient core whose average properties are $\overline{\alpha}_s \simeq 14.4 \times 10^{-7}/°C.$ $\bar{T}_s \approx 805°$ C.

$\bar{E} \approx 8.4 \times 10^6$ psi $\nu \approx 0.2$.

Figure 2:
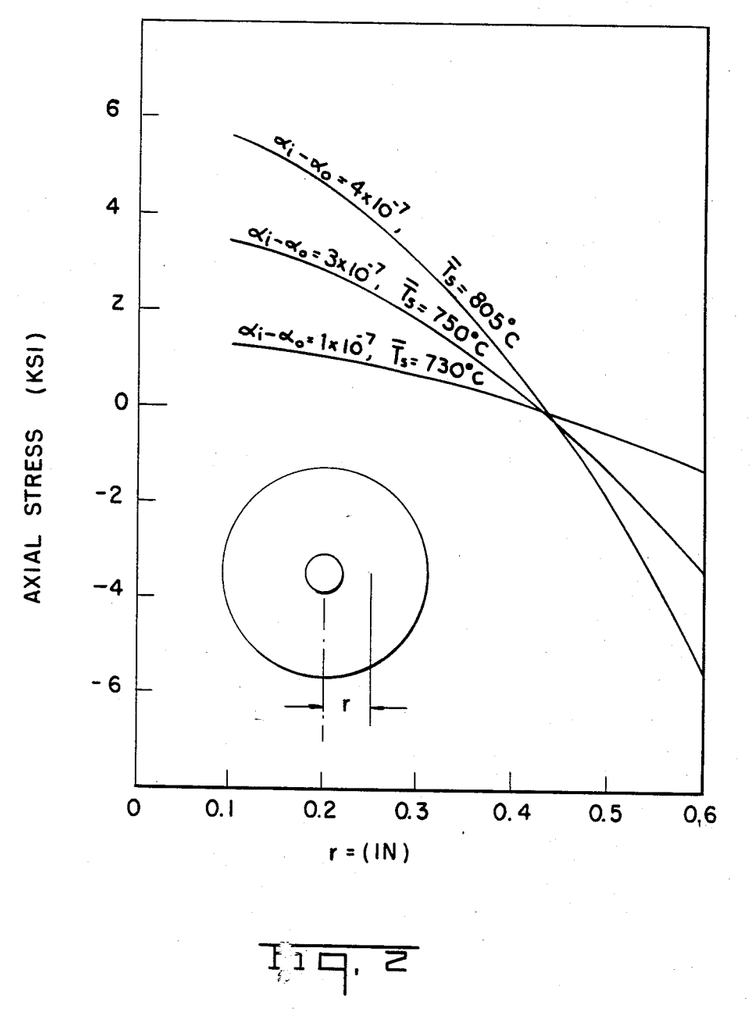
FIG. 2 shows the radial variation of axial stress in an optical waveguide preform.
Figure 3:
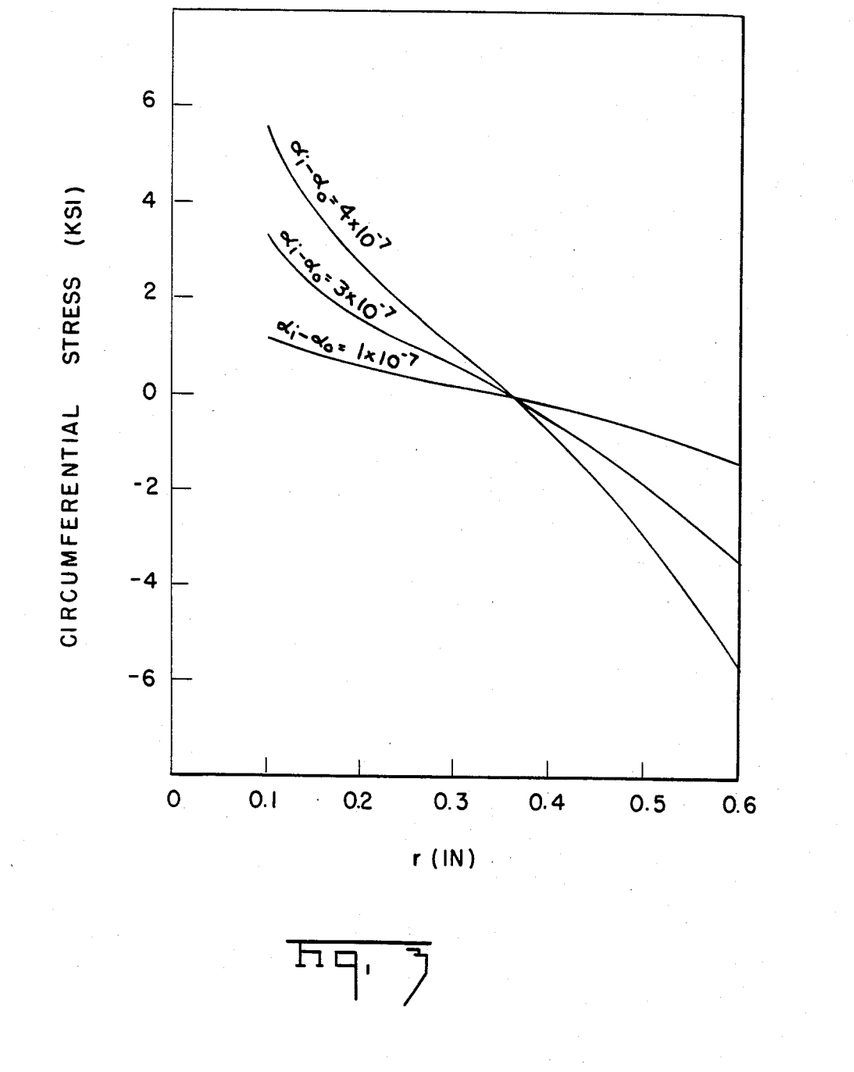
FIG. 3 shows the variation of circumferential stress with radial coordinate in an optical waveguide preform.

FIGS. 2 and 3 show the variation of axial and circumferential (equations 14 and 15) stresses with r for preforms with the above core and three different cladding compositions. As the expansion difference $(\alpha_i - \alpha_o)$ and the setting temperature $\bar{T}_s$ decrease, the maximum values of axial and circumferential stresses at the surface of the hole also decrease. This is an effective technique to minimize the stress level.

As a second example consider a gradient preform with cladding of constant composition. The average properties of core and cladding are assumed as:

$\bar{\alpha}_s \approx 9.5 \times 10^{-7}/°$C.

$\bar{T}_s \approx 795°$ C.

$E_c = \bar{E} \approx 9.6 \times 10^6$ psi $\nu \approx 0.19$ $\alpha_c \approx 3 \times 10^{-7}/$ $T_c \approx 925°$ C.

Figure 4:
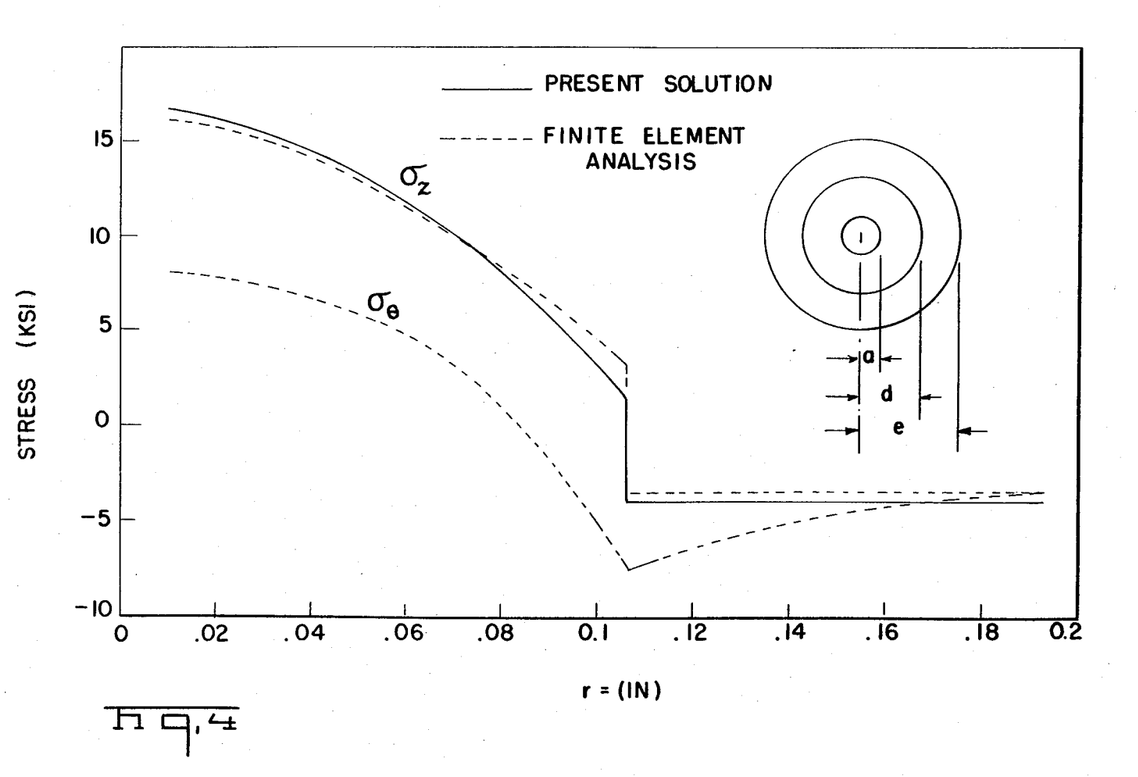
FIG. 4 shows the distribution of axial and circumferential stresses in an optical waveguide preform.
Figure 5:
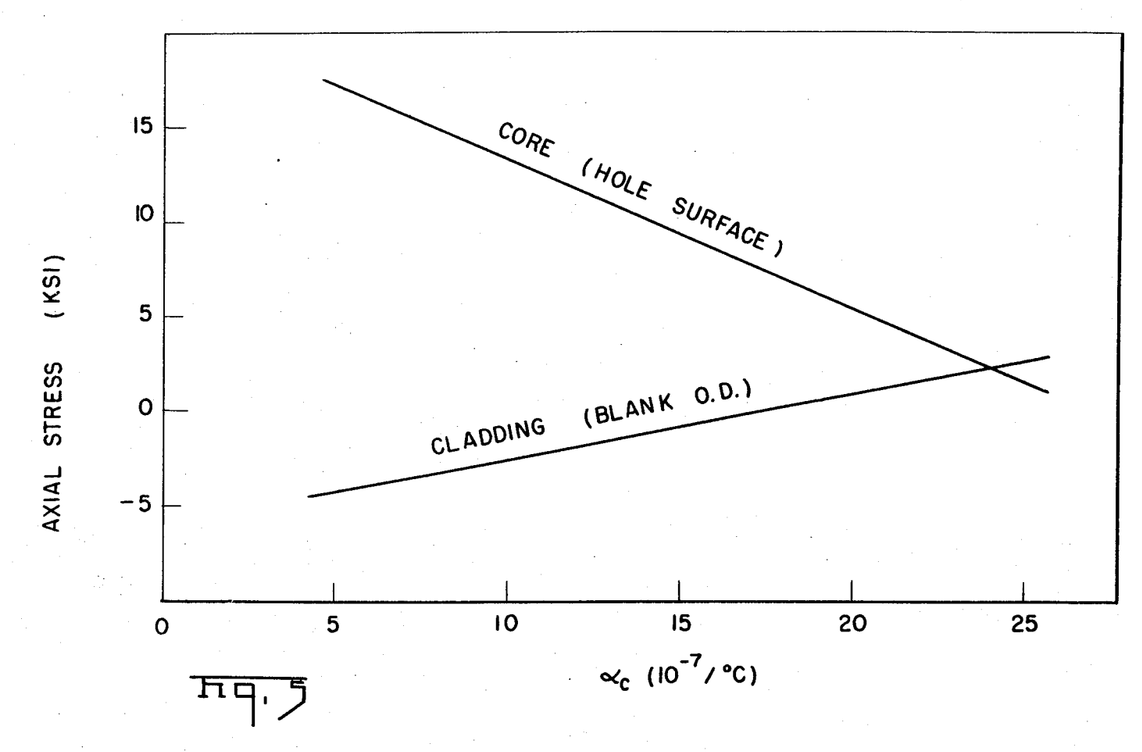
FIG. 5 shows axial stress as a function of expansion coefficient of the cladding.

The axial and circumferential stresses as given by eqns. 14, 15 and 18 through 21 are plotted as a function of r in FIG. 4. The agreement between the solution given here (solid line) and that given by finite element analysis (dotted line) is extremely good. The large magnitude of axial tension at the surface of the hole should be noted. Such a high tension may cause failure of the preform due to the presence of flaws at the surface of the hole. Since $\alpha_c < \bar{\alpha}_s$, the effect of cladding is extremely harmful insofar as residual stresses are concerned. We may reduce the high level of core tension by increasing $\alpha_c$ through appropriate composition adjustments. FIG. 5 shows the dependence of axial tension at the surface of the hole on the expansion coefficient of the cladding. It is clear that the core tension can be reduced drastically by modest changes in the expansion coefficient of the cladding. Likewise, the axial stress in the cladding can be kept very low. Also, if the composition modifications reduce the setting temperature of the cladding, the stresses will decrease correspondingly.

An example of a preform which was successfully prepared in accordance with this invention is one containing 25% GeO₂ and 2% B₂O₃ at the bait rod surface and 0% GeO₂ and 16% B₂O₃ at the outside diameter. The concentrations of these oxides were varied parabolically. The preforms were examined under polarized light to obtain a measure of residual tension. The axial tension at the bait surface was measured to be 2430 psi. Similarly, the circumferential stress was measured (using a disc cut from the preform) to be 3900 psi. In the past, high NA preforms had residual tension >9000 psi. This shows that composition changes reduce the harmful tensile stresses, and make the high NA preform more likely to survive the consolidation and acid-etching processes.

Optical waveguides were drawn from the exemplary preform and drew very well despite wide variation of viscosity due to composition profile. The measured NA (90%) values were 0.194 and 0.191.

In the preceding example, both GeO₂ and B₂O₃ were varied parabolically. It is also possible to vary the concentration of GeO₂ parabolically and to vary the concentration of B₂O₃ in a manner which maintains the thermal expansion coefficient constant throughout the preform. The radial change in concentration of GeO₂, denoted G(r), is chosen to suit optical requirements. Then, the radial change in concentration of B₂O₃, denoted B(r) is such that the expansion coefficient is constant. It is known that the thermal expansion coefficient is related to the concentration of the two components by the following:

$$X = a_0 + a_1 B + a_2 G + a_3 B^2 + a_4 G^2 \qquad (22)$$

where B is the concentration of B₂O₃, G is the concentration of GeO₂ and the constants $a_0, a_1 \ldots a_4$ can be determined empirically.

Assume a radial parabolic change in concentration of GeO₂ which is given by $$G(r) = G_0[1 - (r/r_c)^\alpha] \qquad (23)$$

where $G_o$ is the peak GeO₂ concentration and $\alpha$ is the profile parameter, typically about 2.2.

Then, the radial variation in concentration of B₂O₃ is given by:

$$B(r) = \frac{-a_1 + [a_1^2 - 4a_3(a_0 + a_2 G(r) + a_4 G^2(r) - X_0)]^{\frac{1}{2}}}{2a_3} \qquad (24)$$

where $X_o$ is the thermal expansion coefficient throughout the blank.

The foregoing technique of minimizing undesirable residual tension at the surface of the hole by adjusting the dopants' concentration is equally applicable to the preform manufactured by the inside process described in Keck and Schultz U.S. Pat. No. 3,711,262. In particular, if the preform obtained by the inside process has a hole at the center after sintering and consolidation, the advantages described above regarding the outside process preform are equally applicable to the inside process preform. Chemical vapor deposition processes can also be used.

While a particular embodiment of the invention has been shown and described, various modifications are within the true spirit and scope of the invention. The appended claims are intended to cover all such modifications.

What is claimed is:

1. The method of making an optical waveguide having a radial gradient index of refraction in the core thereof, comprising:

forming a glass tubular member having at least three constituents including a silicon compound and dopants, a first of said constituents being a dopant which produces glass having a changing refractive index and thermal expansion coefficient with variations in concentration, a second of said constituents being a dopant producing changing thermal expansion coefficient with variations in concentration;

radially changing the concentration of said first of said constituents while forming to produce a radially varying index of refraction;

changing the concentration of said second of said constituents radially while forming to maintain the thermal expansion coefficient substantially constant throughout said radial gradient of said tubular member;

coating said tubular member with a layer of cladding glass having an index of refraction less than that of the core formed by the preceding steps; and adding to the composition of said cladding layer a constituent producing substantially no increase in the index of refraction and which increases the thermal expansion coefficient of said cladding to approximately the composite thermal expansion coefficient of said core so that residual stresses in said core caused by a different expansion coefficient cladding become compressive.

2. The method recited in claim 1 wherein the step of forming a glass tubular member is performed by outside vapor phase oxidation including the steps of:

providing a substantially cylindrical starting member;

rotating said cylindrical starting member about the longitudinal axis thereof;

entraining in a gaseous medium predetermined amounts of each of said constituents in vapor form;

oxidizing said vapor in a flame to form a soot having a specified composition; and applying said soot to the exterior peripheral surface of said cylindrical starting member; and wherein the steps of radially changing the concentration of said constituents includes:

varying the amount of vapor entrained in said gaseous medium of at least two of said constituents to radially change the concentrations of said first and said second constituents.

3. The method recited in claim 1 wherein said first constituent is $GeO_2$.

4. The method recited in claim 1 wherein said second constituent is $B_2O_3$.

5. The method recited in claim 1 wherein the constituent added to the composition of said cladding layer is $B_2O_3$.

6. The method recited in claim 1 wherein said composite thermal coefficient of expansion is given by:

$$\overline{\alpha}_s = \tfrac{1}{2} (\alpha_i + \alpha_o)$$

where $\overline{\alpha}_s$ is said composite thermal expansion coefficient, $\alpha_i$ is the thermal expansion coefficient at the inner radius of said tubular member and $\alpha_o$ is the thermal expansion coefficient at the outer radius of said tubular member.

7. The method recited in claim 1 wherein said radially varying index of refraction is parabolic.

8. The method recited in claim 1 wherein the concentrations of said first and second constituents are changed parabolically.

9. An optical waveguide made by the method of claim 1.

* * * * *

UNITED STATES PATENT AND TRADEMARK OFFICE
CERTIFICATE OF CORRECTION

PATENT NO. : 4,358,181
DATED : November 9, 1982
INVENTOR(S) : Suresh T. Gulati et al It is certified that error appears in the above—identified patent and that said Letters Patent is hereby corrected as shown below:

Column 2, line 28, "are" should be --and--.

Column 3, line 11, "theraml" should be --thermal--.

Column 4, line 46, "la gest" should be --largest--.

Signed and Sealed this

Fifth Day of April 1983

[SEAL]

Attest:

GERALD J. MOSSINGHOFF

Attesting Officer     Commissioner of Patents and Trademarks